US011562505B2

(12) United States Patent
Davis et al.

(10) Patent No.: US 11,562,505 B2
(45) Date of Patent: Jan. 24, 2023

(54) SYSTEM AND METHOD FOR REPRESENTING AND DISPLAYING COLOR ACCURACY IN PATTERN MATCHING BY A VISION SYSTEM

(71) Applicant: Cognex Corporation, Natick, MA (US)

(72) Inventors: Jason Davis, Franklin, MA (US); Zihan Hans Liu, Cambridge, MA (US); Nathaniel R. Bogan, Natick, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 16/297,645

(22) Filed: Mar. 9, 2019

(65) Prior Publication Data

US 2020/0074685 A1 Mar. 5, 2020

Related U.S. Application Data

(60) Provisional application No. 62/647,804, filed on Mar. 25, 2018.

(51) Int. Cl.
*G06T 7/90* (2017.01)
*G06T 11/00* (2006.01)
*G06T 11/20* (2006.01)

(52) U.S. Cl.
CPC .............. *G06T 7/90* (2017.01); *G06T 11/001* (2013.01); *G06T 11/20* (2013.01); *G06T 2200/24* (2013.01); *G06T 2207/10024* (2013.01)

(58) Field of Classification Search
CPC ......... G06T 7/90; G06T 11/001; G06T 11/20; G06T 2200/24; G06T 2207/10024;
(Continued)

(56) References Cited

U.S. PATENT DOCUMENTS 3,315,160 A 4/1967 Soodman
3,496,370 A 2/1970 Haville
(Continued)

FOREIGN PATENT DOCUMENTS

JP 08086716 A 4/1996
JP 08189905 A 7/1996
(Continued)

OTHER PUBLICATIONS

Ip.com, Jul. 2020 (Year: 2020).*
(Continued)

*Primary Examiner* — Nimesh Patel
(74) *Attorney, Agent, or Firm* — Loginov & Associates, PLLC; William A. Loginov

(57) ABSTRACT

This invention provides a system and method for displaying color match information on an acquired image of an object. A model/pattern having a plurality of color test points at locations of stable color is provided. A display process generates visible geometric shapes with respect to the color test points in a predetermined color. An alignment process aligns features of the object with respect to features on the model so that the geometric shapes appear in locations on the object that correspond to locations on the model. The geometric shapes can comprise closed shapes that surround a region expected to be stable color on the object. Such shapes can define circles, squares, diamonds or any other acceptable closed or open shape that is visible to the user on the display.

18 Claims, 11 Drawing Sheets

(58) Field of Classification Search
CPC ........... G06T 2207/30108; G06T 7/001; G06T 19/006; G06T 2207/10048; G06T 2207/30041; G06T 7/0012; G06T 7/70; G06T 2207/30121; G06T 7/0004; G06T 2207/10016; G06T 2207/30201; G06T 7/73; G06T 2207/10012; G06K 2209/19; G06K 9/4652; G06K 9/2063; G06K 9/00362; G06K 9/00771; G06K 9/00778; G06K 9/2027; G06K 7/10792; H04N 1/6077; H04N 1/56; H04N 13/324; H04N 13/344; H04N 17/00; H04N 2013/0081; H04N 17/02; H04N 1/6052; H04N 9/73; H04N 17/045; H04N 9/3147; H04N 9/3191; H04N 13/122; H04N 13/128; H04N 13/133; H04N 13/20; H04N 9/3105; G01N 29/4436; G01N 29/043; G01N 29/0645; G01N 29/262; G01N 2291/0231; G01N 29/265; G01N 2291/0289; G01N 2291/044; G01N 29/04; G01N 29/069; G01N 29/30; G01N 2021/8829; G01N 21/25; G01N 29/06; G01N 29/07; G01N 29/223; G01N 29/226; G01N 29/27; G01N 29/4472; A61B 3/024; A61B 3/032; A61B 3/066; A61B 5/1072; A61B 5/7267; A61B 5/1128; A61B 3/08; A61B 5/742; A61B 2562/0204; G06F 3/04842; G06F 3/1446; G06F 30/00; G06F 3/04812; G06F 3/04845; G06F 19/3481; G06F 11/3688; G06F 19/00; G06F 19/3456; G09G 5/02; G09G 1/165; G09G 2320/06; G09G 2320/08; G09G 2300/026; G09G 2320/0666; G09G 2320/0686; G09G 2340/06; G09G 2354/00; G09G 2356/00; G09G 3/2003; G09G 3/3426; G09G 5/00; G09G 5/026; G09G 5/06; G09G 3/006; G09G 2320/0693; G09G 3/002; G09G 3/34; G09G 3/346; G09G 3/3611; G09G 5/346; G02B 2027/0132; G02B 2027/0136; G02B 27/017; G02B 27/0172; G02B 26/10; G02B 27/0025; G01B 11/2518; G01B 21/16; G01B 21/20; G01B 21/22; G01B 11/2509; G01B 11/2513; G01B 11/165; G01B 11/245; G01B 11/272; G01J 3/506; G01J 3/46; G01J 3/524; G01J 2003/466; G01J 3/465; G01J 3/501

See application file for complete search history.

(56) References Cited

U.S. PATENT DOCUMENTS

| | | | |
|---|---|---|---|
| 3,636,513 A | 1/1972 | Tisdale | |
| 3,638,188 A | 1/1972 | Pincoffs | |
| 4,414,635 A | 11/1983 | Gast | |
| 4,581,762 A | 4/1986 | Lapidus | |
| 5,109,425 A | 4/1992 | Lawton | |
| 5,495,429 A | 2/1996 | Craven | |
| 5,671,735 A | 9/1997 | MacFarlane | |
| 5,875,040 A | 2/1999 | Matraszek | |
| 6,173,070 B1 | 1/2001 | Michael | |
| 6,323,776 B1 | 11/2001 | Jackson | |
| 6,476,803 B1 | 11/2002 | Zhang | |
| 6,535,632 B1 | 3/2003 | Park | |
| 6,714,665 B1 | 3/2004 | Hanna | |
| 6,751,338 B1 | 6/2004 | Wallack | |
| 6,778,698 B1 | 8/2004 | Prakash | |
| 6,836,560 B2 | 12/2004 | Emery | |
| 6,919,892 B1* | 7/2005 | Cheiky | G06T 13/40 345/473 |
| 6,920,241 B1 | 7/2005 | Dutta-Choudhury | |
| 6,941,026 B1 | 9/2005 | Nadabar | |
| 7,016,539 B1 | 3/2006 | Silver | |
| 7,020,329 B2 | 3/2006 | Prempraneerach | |
| 7,043,055 B1 | 5/2006 | Silver | |
| 7,110,602 B2 | 9/2006 | Krause | |
| 7,181,066 B1 | 2/2007 | Wagman | |
| 7,268,939 B1 | 9/2007 | McDowell | |
| 7,454,841 B2 | 11/2008 | Burns, Jr. | |
| 7,558,419 B1 | 7/2009 | Ye | |
| 7,995,054 B2 | 8/2011 | Wheeler | |
| 3,054,217 B2 | 11/2011 | Bruyere | |
| 8,233,670 B2 | 7/2012 | Moed | |
| 8,260,059 B2 | 9/2012 | Hofhauser | |
| 8,269,830 B1 | 9/2012 | Delaney | |
| 8,379,014 B2 | 2/2013 | Wiedemann | |
| 8,442,304 B2 | 5/2013 | Marrion | |
| 8,447,099 B2 | 5/2013 | Wang | |
| 8,488,877 B1 | 7/2013 | Owechko | |
| 8,712,118 B2 | 4/2014 | De La Torre-Bueno | |
| 9,800,852 B1 | 10/2017 | Kolb | |
| 10,046,229 B2 | 8/2018 | Tran | |
| 10,149,958 B1 | 12/2018 | Tran | |
| 10,192,283 B2* | 1/2019 | Davis | G06K 9/4604 |
| 10,315,306 B2 | 6/2019 | Abramson | |
| 10,325,376 B2 | 6/2019 | Smits | |
| 10,376,327 B2 | 8/2019 | Jenkins | |
| 2002/0057838 A1 | 5/2002 | Steger | |
| 2003/0083850 A1* | 5/2003 | Schmidt | G06T 7/001 702/189 |
| 2005/0023354 A1 | 2/2005 | Sali | |
| 2005/0100245 A1 | 5/2005 | Chen | |
| 2006/0088202 A1 | 4/2006 | Venkatachalam | |
| 2006/0104507 A1 | 5/2006 | John | |
| 2006/0269136 A1 | 11/2006 | Squires | |
| 2007/0146491 A1 | 6/2007 | Tremblay | |
| 2007/0161898 A1 | 7/2007 | Hao | |
| 2008/0181487 A1 | 7/2008 | Hsu | |
| 2008/0311551 A1 | 12/2008 | Reed | |
| 2009/0002224 A1 | 1/2009 | Khatib | |
| 2009/0116748 A1 | 5/2009 | Davison | |
| 2009/0232388 A1 | 9/2009 | Minear | |
| 2011/0235855 A1 | 9/2011 | Smith | |
| 2011/0255743 A1 | 10/2011 | Guan | |
| 2011/0286628 A1 | 11/2011 | Goncalves | |
| 2012/0020545 A1 | 1/2012 | Oike | |
| 2012/0229789 A1 | 9/2012 | Kang | |
| 2013/0096884 A1 | 4/2013 | Parker | |
| 2013/0163851 A1 | 6/2013 | Dalla-Torre | |
| 2013/0242354 A1 | 9/2013 | Dewancker | |
| 2013/0293532 A1 | 11/2013 | Vaddadi | |
| 2013/0308875 A1 | 11/2013 | Jacobson | |
| 2013/0336575 A1 | 12/2013 | Dalla-Torre | |
| 2014/0050387 A1 | 2/2014 | Zadeh | |
| 2014/0078353 A1 | 3/2014 | Tezaur | |
| 2014/0086495 A1 | 3/2014 | Hao | |
| 2014/0120319 A1 | 5/2014 | Joseph | |
| 2014/0192050 A1 | 7/2014 | Qiu | |
| 2014/0337775 A1 | 11/2014 | Northrup | |
| 2015/0003723 A1 | 1/2015 | Huang | |
| 2015/0006126 A1 | 1/2015 | Taguchi | |
| 2015/0015602 A1 | 1/2015 | Beaudoin | |
| 2015/0332464 A1 | 11/2015 | O'Keefe | |
| 2016/0012317 A1 | 1/2016 | Mayle | |
| 2016/0110865 A1 | 4/2016 | Alvarez Guerras | |
| 2016/0180198 A1 | 6/2016 | Davis | |
| 2016/0224861 A1* | 8/2016 | Vogh, Jr. | G06K 9/4661 |
| 2016/0292836 A1* | 10/2016 | Perry | G06F 3/04845 |
| 2016/0364912 A1 | 12/2016 | Cho | |
| 2016/0379351 A1 | 12/2016 | Michael | |
| 2017/0148155 A1 | 5/2017 | Wei | |
| 2017/0178321 A1 | 6/2017 | Nieves Alicea | |
| 2018/0012399 A1* | 1/2018 | Zhang | G06T 7/55 |

(56) References Cited

U.S. PATENT DOCUMENTS

2018/0053318 A1     2/2018   Xiao
2018/0225799 A1*   8/2018   Davis ..................... G06T 7/60

FOREIGN PATENT DOCUMENTS

| | | |
|---|---|---|
| JP | 11195121 A | 7/1999 |
| JP | 2003507796 A | 2/2003 |
| JP | 2007218743 A | 8/2007 |
| JP | 2013257304 A | 12/2013 |
| JP | 2017502362 A | 1/2017 |
| KR | 101279561 | 6/2013 |
| WO | 9740342 A2 | 10/1997 |
| WO | 0113326 A2 | 2/2001 |
| WO | 2010042466 A1 | 4/2010 |
| WO | 2012146253 A1 | 11/2012 |
| WO | 2015002114 A1 | 1/2015 |
| WO | 2015049233 A1 | 4/2015 |

OTHER PUBLICATIONS

Shou-Der Wei et al., "Robust and Efficient Image AlignmentBased on Relative Gradient Matching", IEEE Transactions on Image Processing, U.S., IEEE, Sep. 18, 2006, vol. 15, No. 10, pp. 2936-2943.

Yasuhiko Hara, "An Overview of Printed Board Appearance Inspection and Examples of Studies", Image Laboratory, vol. 26, No. 1, pp. 70-78, Jan. 10, 2015.

\* cited by examiner

SYSTEM AND METHOD FOR REPRESENTING AND DISPLAYING COLOR ACCURACY IN PATTERN MATCHING BY A VISION SYSTEM

RELATED APPLICATION

This application claims the benefit of U.S. Provisional Application Ser. No. 62/647,804, entitled SYSTEM AND METHOD FOR REPRESENTING AND DISPLAYING COLOR ACCURACY IN PATTERN MATCHING BY A VISION SYSTEM, filed Mar. 25, 2018, the teachings of which are expressly incorporated herein by reference.

FIELD OF THE INVENTION

This invention relates to machine vision systems and associated methods for alignment and inspection of objects in an imaged scene having color features

BACKGROUND OF THE INVENTION

Machine vision systems, also termed "vision systems" herein, are used to perform a variety of tasks in a manufacturing environment. In general, a vision system consists of one or more cameras with an image sensor (or "imager") that acquires grayscale or color images of a scene that contains an object under manufacture. Images of the object can be analyzed to provide data/information to users and associated manufacturing processes. The data produced by the image is typically analyzed and processed by the vision system in one or more vision system processors that can be purpose-built, or part of one or more software application(s) instantiated within a general purpose computer (e.g. a PC, laptop, tablet or smartphone).

Common vision system tasks include alignment and inspection. In an alignment task, vision system tools, such as the well known PatMax® system commercially available from Cognex Corporation of Natick, Mass., compares features in an image of a scene to a trained (using an actual or synthetic model) pattern, and determines the presence/absence and pose of the pattern in the imaged scene. This information can be used in subsequent inspection (or other) operations to search for defects and/or perform other operations, such as part rejection.

It is challenging for a vision system to match certain imaged features to trained patterns. This can result from a lack of high-contrast edges (which most pattern matching tools use to base matching decisions). The existence of clutter—contrast features that are separate from the expected edges—can be employed to assist matching decisions, as described in commonly assigned U.S. patent application Ser. No. 14/580,153, entitled SYSTEM AND METHOD FOR DETERMINING CLUTTER IN AN ACQUIRED IMAGE, filed Dec. 24, 2014, by Jason Davis, et al, the teachings of which are incorporated by reference as useful background information. This system and method operates to discern grayscale-based clutter in a runtime image, and more particularly, it allows determination of a clutter score that enables matching of candidate poses with respect to a trained pattern. The trained pattern is provided with a set of clutter test points (also termed "probes") that represent a level of emptiness in the trained pattern. A runtime pose with a coordinate space for the image with respect to the trained pattern is established. The clutter test points are then mapped onto the coordinate space for the image, and the level of emptiness is determined at the mapped clutter test points. Based upon the level of emptiness, a level of clutter in (at least a portion of) the acquired image is determined.

In many applications of machine vision it is desirable to match patterns that contain distinct image information other than edges—such as color. Similar to how clutter estimates are less stable in regions of high gradient, color is typically least stable at the object edges and/or transitions between different object colors in the image. Hence probes that are established to match color are most effectively deployed in regions remote from high gradient. Nevertheless, inaccurate matches between trained and runtime color images can occur, and in color image training and runtime color matching, there is an absence of a clear metric of successful versus unsuccessful color matches that alert the user and/or automated systems.

SUMMARY OF THE INVENTION

This invention overcomes disadvantages of the prior art by providing a system and method for displaying color match information to a user of a vision system. Color test points (probes) are placed in areas with stable color information. At run time, the color matching produces a match score for the user. When there is a poor (low-scoring) match, a user who wants to improve the runtime inspection process or the models/patterns developed during training desires knowledge of which areas of the pattern failed to match well. The color information at each color test point location (used in scoring of matches by a separate process) is stored and the points are transformed into the runtime image coordinate space during alignment of the model with the runtime image features. The procedure reports the particular test points and the colors that were expected at those locations on the runtime image. Each point becomes the center (or another locational reference) of a small displayed (e.g. closed) geometric shape (circle, square, diamond, etc.), which can be hollow, delineating an open central area, and which is colored with the value carried forward from the training image. When these (e.g.) circles are overlain on the displayed runtime image, they are by definition in areas expected to have a small region of stable color based upon the trained model locations for such points. When the circles are placed in areas having a close color match, they are virtually invisible to the user's eye via the interface display screen. For example, a red O-shape essentially disappears into a closely matching, red displayed object background. Conversely, when the shape is located in an area of mismatch, it is clearly visible to the user's eye. For example a red O-shape will appear on a blue displayed background, or even against a slightly different hue of red background.

The identified mismatch thereby allows the user to confirm the robustness of a trained model/pattern, identify parameters that may require adjustment in either the model or the runtime imaged scene (e.g. lighting) of assist in identifying defects in runtime objects.

In an illustrative embodiment, a system and method for displaying color match information on an acquired image of an object is provided. The system and method includes a model having a plurality of color test points at locations of stable color. A display process generates visible geometric shapes with respect to the color test points in a predetermined color. An alignment process aligns features of the object with respect to features on the model so that the geometric shapes appear in locations on the object that correspond to locations on the model. Illustratively, the geometric shapes can comprise closed shapes that surround a region expected to be stable color on the object. The geometric shapes can comprise at least one of circles, squares, ovals and diamonds, and can be are sized so as to be visible by a user compared to an adjacent background on the object within a predetermined range of zoom of features of the object in a display. Optionally, a scoring process can map the color test points with respect to the runtime image and provide a color score for each of the points to determine whether a sufficient match has occurred. An interface can be arranged to allow a user to input at least one of feedback and adjustments to a vision system associated with the alignment process based on visual analysis of the displayed geometric shapes. Illustratively, a color match is determined by providing a value for the color in a predetermined color space of the model at the test points and comparing to values at respective mapped points in the object image. A mask can be applied to the object image, whereby the mask indicates which areas of the object image are evaluated for color match. The color test points typically reside in regions of low color gradient. The regions of low color gradient can be based upon a gradient magnitude threshold. The gradient magnitude threshold can be established by at least one of (a) a user-input parameter and (b) a system-generated parameter.

BRIEF DESCRIPTION OF THE DRAWINGS

The invention description below refers to the accompanying drawings, of which.

DETAILED DESCRIPTION

I. System Overview

Figure 1:
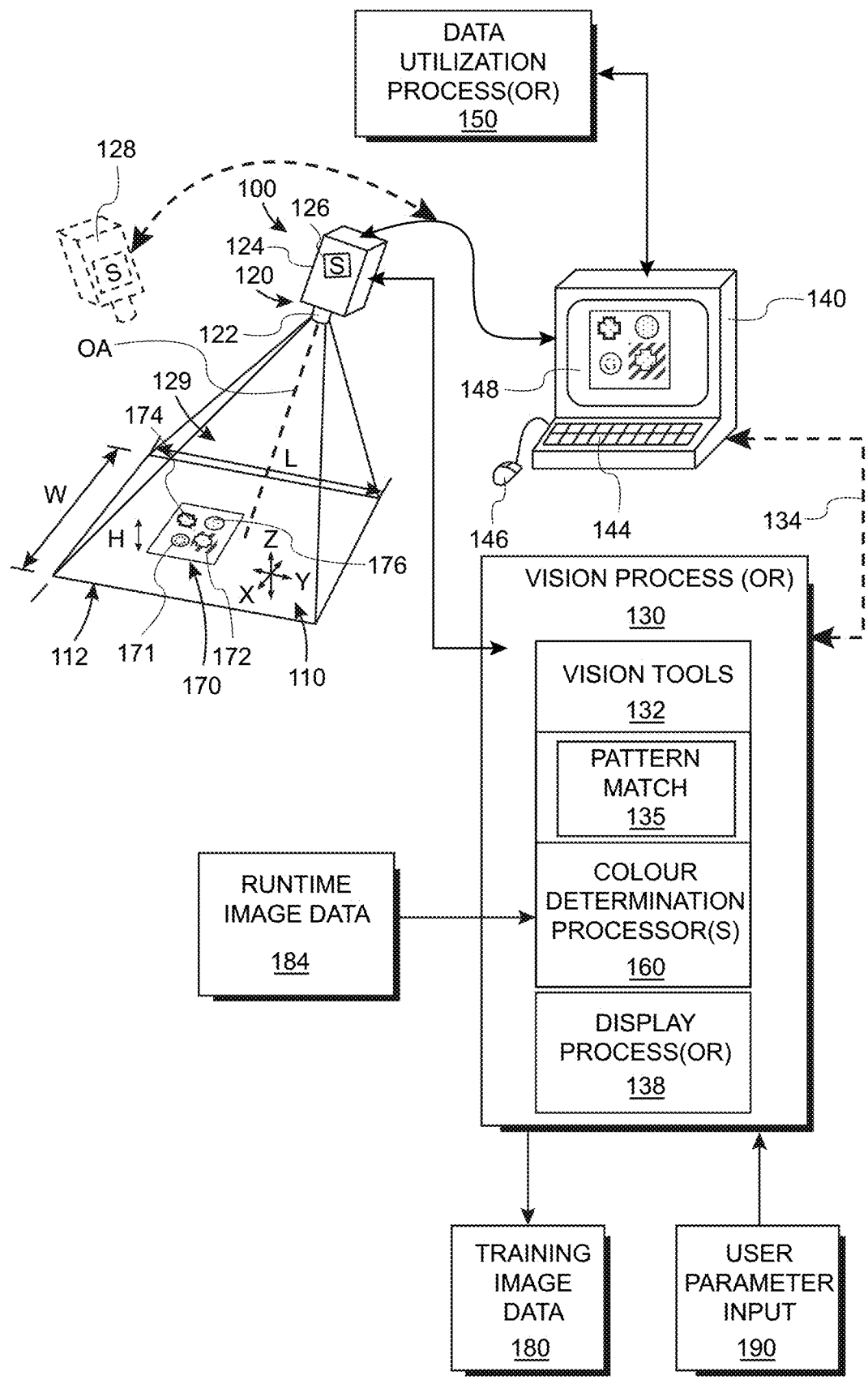
FIG. 1 is a diagram of a vision system arranged to acquire a color (and optionally, grayscale and/or range) image of a surface of an object containing exemplary features in which regions with distinctive color are present.

FIG. 1 shows a machine vision system arrangement (also termed simply, "vision system") 100 for use in inspecting and/or analyzing features on an object surface in a scene 110 that is imaged within the field of view (FOV) 112 of a vision system camera assembly 120. The camera assembly 120 can be any acceptable arrangement of components and typically includes a lens assembly 122 and a camera body 124 that houses an image sensor (or "imager") 126, based upon any acceptable imaging technology, such as CCD or CMOS. The imager 126 can be arranged to acquire images in two dimensions (e.g. length L and width W) in an array of image pixels that can be adapted to sense the scene in color and/or another image data form. For example, the camera can also be arranged to acquire three-dimensional (3D) information about the imaged scene within a working space (for example the pyramidal volume 129) that also defines an object height H. A variety of 3D imaging technologies can be employed, for example including, but not limited to, a laser displacement sensor (profiler), a stereoscopic camera, a sonar, laser or LIDAR range-finding camera, time-of-flight sensor, and a variety of other passive or active range-sensing technologies. Such cameras produce a range image wherein an array of image pixels (typically characterized as positions along orthogonal x and y axes) is produced that contains the third (height) dimension for each pixel (typically characterized along a z axis perpendicular to the x-y plane).

The camera body can contain various image processing components that constitute a vision process(or) 130 that operates an associated vision process. The vision process(or) operates upon the acquired images of the scene and can employ vision system tools, modules and/or processes 132 to extract information from the acquired image. This information can relate to features of interest and other items appearing within the image—for example vision system tools such as the well known PatMax® and/or PatMax RedLine® available from Cognex Corporation of Natick, Mass., can be used to analyze features in the image and provide information on relative pose, alignment and other details—e.g. presence/absence, etc. These tools can be used generally to perform geometric pattern matching 134.

While some or all of the vision system processes can be instantiated within the body 124 of the camera assembly 120, it is expressly contemplated that some or all of the processes (as indicated by dashed arrow 134) can be carried out by an interconnected (wired or wireless) computing device/processor, such as a purpose-built processor or a general purpose computer (e.g. server, PC, laptop, smartphone, tablet, etc.) 140, with appropriate user interface 142 and display 144, 146 and display 148. The interconnected computing device/processor 140 can employ the processed image data to carry out further utilization tasks (i.e. using a "utilization element(s)" or "utilizer" process(es)) 150. For example, where the vision system carries out inspection tasks, the information can be used to provide quality control information to a database or to reject defective parts on a line. The information can also be used (e.g.) in logistics applications, by reading labels and/or ID codes on objects. A variety of other utilization tasks can also be undertaken with image data and associated information. Note that while a single camera 120 is shown, the overall "camera assembly" can include a plurality of cameras (e.g. additional camera 128, shown in phantom) each imaging the scene, and defining an overall FOV/working space. Such cameras can be tied together via the vision system processor 130, or another processing modality. Various calibration techniques known to those of skill can be used to create a common coordinate system between the cameras when imaging the scene and objects therein.

In the illustrative embodiment, the vision process and processor includes a Determination process(or) (also termed a "module") 160 that finds and analyzes a value/level of color, and, optionally, other information (for example, grayscale information and/or 3D range, where these three metrics can be herein collectively termed "color/grayscale/range") in regions of interest of the imaged scene/object at training time and runtime. Whether grayscale or range is processed in addition to color depends upon the inherent capabilities of the camera, and what form of distinct image information allows objects to be appropriately identified at locations remote from their edges. In general, the determination process(or) or module 160 operates to determine a level of color in an acquired image according to embodiments herein. Color is typically characterized by three variables associated with each color pixel in the image—for example red, green and blue (RGB), cyan, magenta and yellow (CMY), HSI, HSV, etc. These are represented in a "color space", where each value has a number within a predetermined range. Similarly, grayscale is represented by a range of gray levels that can range over (e.g.) 8-16 bits. Height or range is represented by a "z" axis value that is defined as a distance within the calibrated working space of the camera—for example a distance along the optical axis OA between the imaged surface and the optical plane of the sensor S (in millimeters, for example). In each case, a location in the image (generally defined by x and y coordinates, or another 2D array) includes this third measure of information that provides associated color, grayscale or range for that image location.

In the exemplary arrangement 100, the camera(s) 120 (and 128) is/are imaging the scene 110 within the FOV 112 and/or working space 129 of the camera(s) 120 (and 128). An exemplary object 170 resides in the scene 110. This object includes exemplary features 171, 172, 173 and 174, surrounded by a background 176. By way of non-limiting example, the features 171, 172, 173 and 174 can differ in terms of color, and potentially, grayscale level, and/or height with respect to each other and/or the background 176. By way of further non-limiting example, the "cross" features 172 and 174 have similar geometric edge arrangements, but differ from each other in terms of color. These differences can be used to supplement or enhance the results of the edge-based pattern matching tool(s) 134 to obtain a more reliable and accurate overall alignment result by adding this to the overall scoring metric that decides which runtime candidate pose provides the best alignment solution with respect to the trained model pattern.

In determining a value for color, grayscale level or range in the image, the system first provides training image data 180, which typically includes features of interest, and can be based upon acquired images of an actual training object surface and/or synthetic image data. That is, the training image and associated training pattern can be specified by a description provided in (e.g.) a CAD model, synthetic square, etc. The term "training image" and "training pattern" should thus be taken broadly to include data sets that are specified generally free of reliance of pixel values. During runtime, the system receives the image data 184 from an acquired image. This can be based on real time acquisition or a stored image of the scene 110 and object 170. The system also receives various input parameters 190 from the user for both training and runtime operation as described further below.

II. Generation of Color Test Points in Training Model

Figure 2:
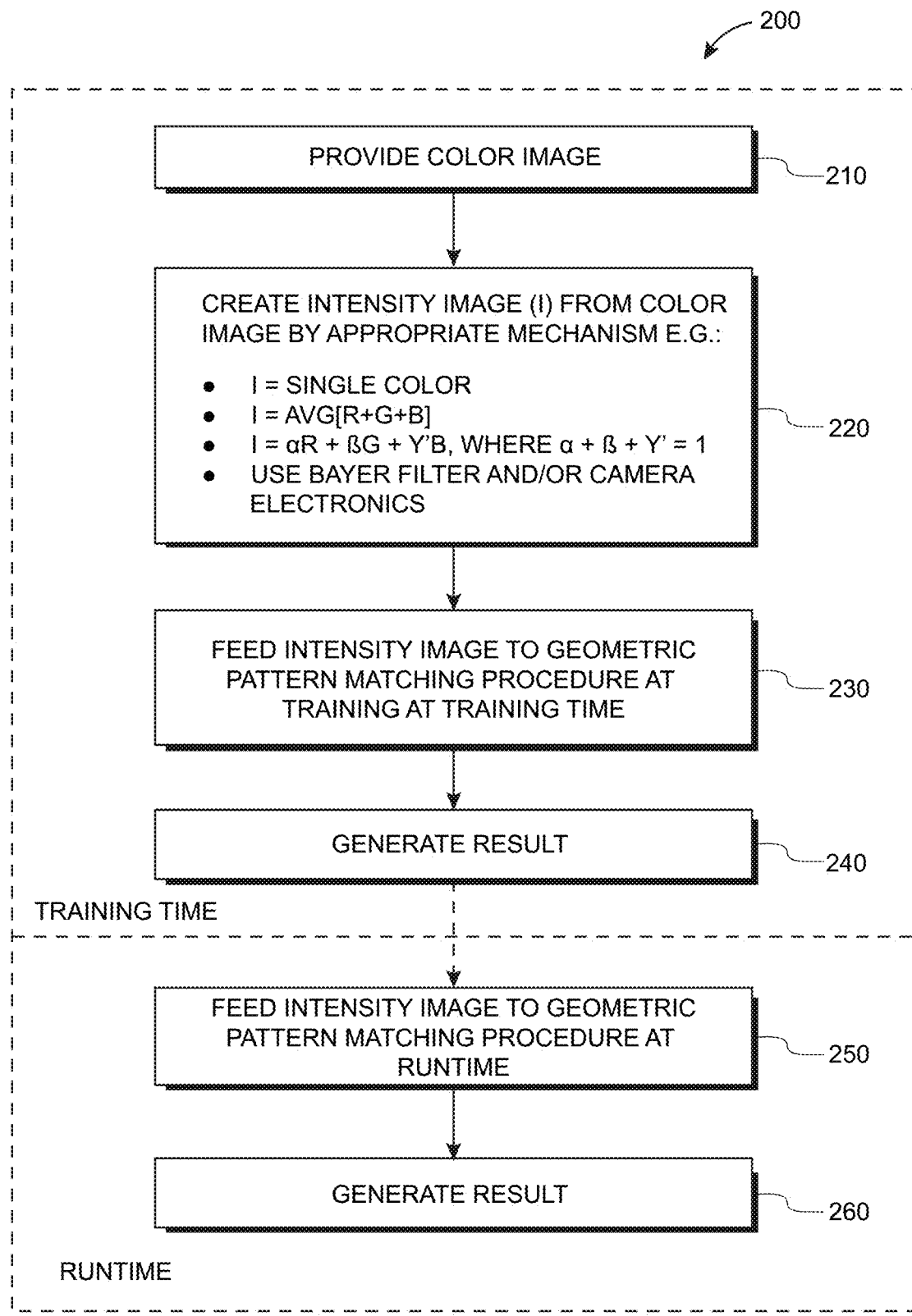
FIG. 2 is an overall procedure for deriving intensity image information (magnitude) for use with a geometric pattern matching tool of FIG. 1 in both training time and runtime operation.

By way of non-limiting example, reference is made to commonly assigned U.S. patent application Ser. No. 15/424,767, entitled SYSTEM AND METHOD FOR SCORING COLOR CANDIDATE POSES AGAINST A COLOR IMAGE IN A VISION SYSTEM, by Jason Davis, et al, the teachings of which are incorporated herein as useful background information. This patent provides an exemplary technique for matching trained color (model) patterns to runtime color images of objects with color features—as well as grayscale and range features. The overall procedure 200 carried out in training and runtime by the above-referenced application is shown in FIG. 2. In this exemplary procedure, an intensity image is created from a color image, if required. Such an image is typically defined by an array/matrix of intensity values each associated with respective pixel locations in the array, with the intensity value defining a number within a certain range (e.g. 16 bits). In step 210, at training time, a color image (that can optionally have grayscale and/or range information) is acquired of a model, or otherwise provided (using a CAD representation, etc.) by the user/operator to the system. Geometric pattern matching can occur based upon either the range image, intensity image, or both in appropriate combination(s). The color image is converted to an intensity image in step 220. In this manner the geometric pattern matching tool can analyze it at training time and runtime. The intensity image can be generated from the color image by a variety of appropriate mechanisms as shown. For example, intensity I can be determined as the value assigned to each pixel for a single color (e.g. the value of the green G pixels). Alternatively, I can be defined as an average of the individual values that define the color space (e.g. I=Avg(R+G+B)) for each pixel. Alternatively, a weighted/normalized average can be employed (e.g. I=$\alpha$R+$\beta$G+$\gamma$B, where $\alpha$+$\beta$+$\gamma$=1). Additionally, the intensity image can be derived according to skill in the art using the camera electronics and/or a Bayer filtering technique.

In step 230 of the procedure 200, the intensity image/ grayscale/range image is fed at training time into the geometric pattern matching tool (134 in FIG. 1), which operates the procedure using the intensity image/grayscale/range image and generates a result which is a training model (step 240).

At runtime, as represented in step 250, an intensity/ greyscale/range image of the runtime scene is again created as described above, and fed into the geometric pattern matching tool and procedure (e.g. Patmax®, Patmax RedLine®, etc.). This is used in generating results which are poses and scores (step 260).

Figure 3:
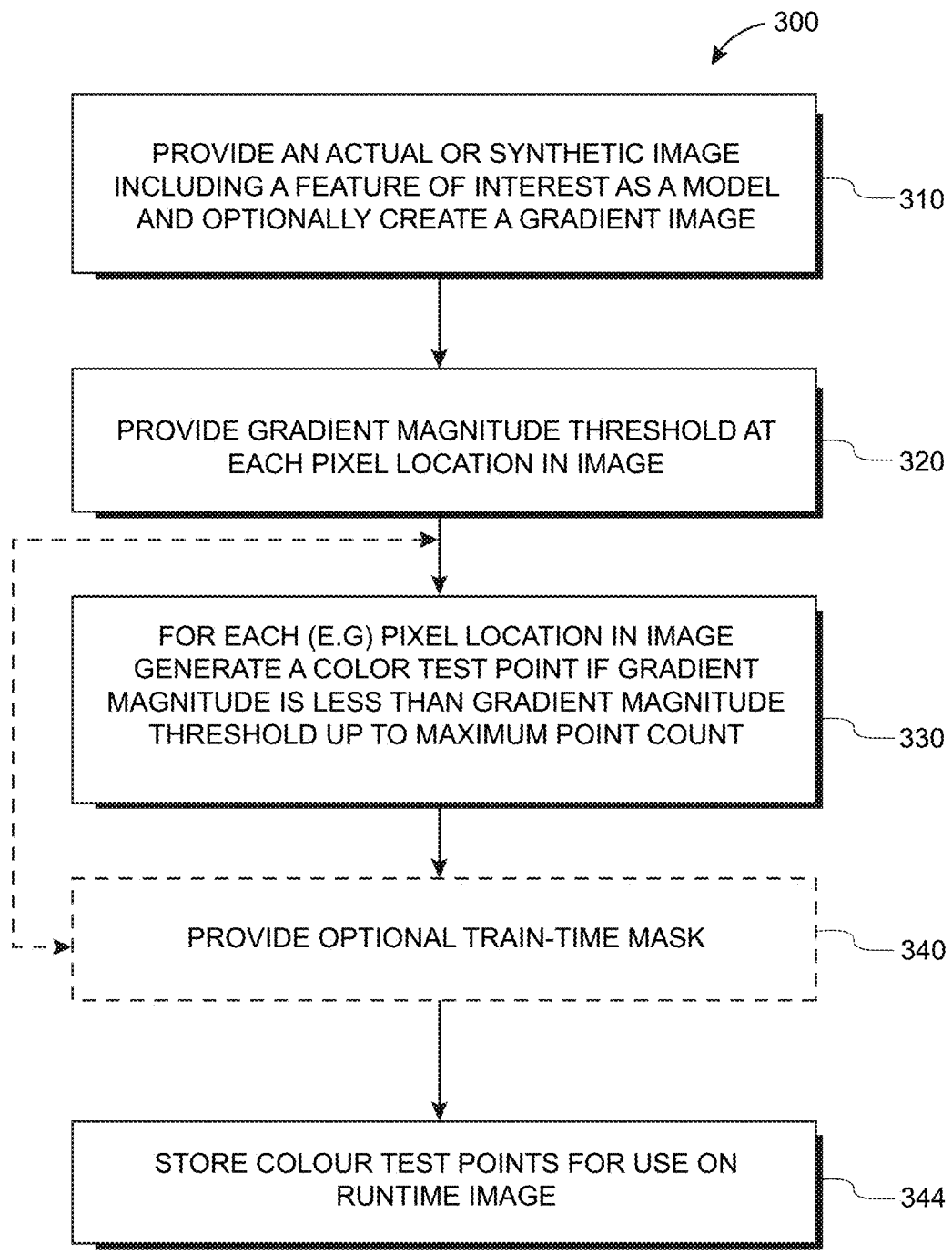
FIG. 3 is a flow diagram of an exemplary training procedure for establishing color test points based upon a model image for use in determining a match to corresponding color information at test points in an aligned runtime image candidate pose.

In FIG. 3, a procedure 300 establishes a training model that is used in a subsequent runtime color determination procedure. An actual or synthetic training image is provided to the system in step 310. The training image is arranged as a two-dimensional (2D) array of pixels, each having coordinates (x and y) and associated intensity value(s) (for example, where multiple colors/color intensities exist). Alternatively, another value, such as height in a height map can describe the pixel at given coordinates. Additionally, the training image can include at least one feature of interest—for example printing and/or graphics that defines contrasting edges and predetermined shapes. The image can be acquired from a physical model by the camera assembly (or another camera arrangement), or can be synthetically produced using predefined shapes for features of interest generated by and inserted into the training image by a user—for example a predefined circle, square, letter, etc. of a given size/scale. Alternatively, the training image can be a data set that contains various edge and clutter values in a manner free of an actual 2D image—for example a matrix of intensity and/or gradient values that reference locations in a region of interest.

As further described in step 310, an optional gradient image can be created. This can be used in subsequent steps as described generally herein. A gradient image is generated by measuring the change between (e.g. intensity level) adjacent pixel values and defining the degree of change as a gradient value at each discrete pixel location in the image.

In step 320, the procedure 300 provides a gradient magnitude threshold value for each pixel location of the training image. This threshold can be provided as a user-input (e.g. via a user interface) or system-provided parameter (e.g. a stored value). The gradient magnitude threshold can be computed in the alternative using an appropriate algorithm that determines the relative values (ranges of values, etc.) of the image data and employs these values in the algorithm to compute the threshold as described generally below.

In step 330, the procedure 300 generates color/grayscale/range test points in association with each specified location in the training image. These locations can be based upon pixel locations or can be associated with sub-pixel locations, or can generally be established with any acceptable coordinate space relative to the training image. Each of the color/grayscale/range test points are established at respective locations that have a gradient magnitude less than the gradient magnitude threshold provided in step 320. In other words, test points (probes) can be applied to weak edges in an image where the measured/analyzed values for gradient magnitude (or another indicia of image features/characteristics) is below a given threshold. As a general consequence of choosing test points at locations of low gradient, they are applied so that they probe areas of the target image that are remote from edges (i.e. high gradient), and other areas of high gradient. In general the test points reside in locations of the training image/pattern in which the gradient approaches or equals zero (i.e. stable regions of the image). It is noted that various embodiments can omit the use of an input threshold value in favor of default value that is set to a low gradient level. In other embodiments, in which an actual threshold value is input, this value can be set (typically) to a low number at which test points are generally omitted from regions of the image with anything above a nearly zero-value gradient.

In general, the above described value for gradient magnitude threshold can be computed similarly to a noise threshold in vision system processes using (e.g.) a histogram. Note that a gradient image can be generated or provided in step 310. In step 310 the gradient image can be computed directly from the intensity/greyscale/range image or alternatively for color images, the gradient image can be computed directly from the color image. For each pixel in the gradient image with a magnitude of less than gradient magnitude threshold, the procedure generates a color/grayscale/range test point. As such, the system considers (for later runtime analysis) locations on the training image/pattern that should have a low gradient magnitude at runtime, and are thus potential locations to provide a test point. These established test points on the training pattern become the locations at which color, grayscale or range information are compared (training versus runtime).

With reference to step 330 in FIG. 3 the generation of color test points can be capped to a maximum color point count in the image according to a set value of MaxColor/Grayscale/RangePixels. These are stored in for subsequent use (i.e. at runtime) in accordance with step 344 of procedure 300 (FIG. 3).

Note that step 340 (shown in phantom) provides an optional train-time mask. This step can occur before or after step 330, or at another appropriate time within the overall procedure 300. The placement of the predetermined number of test points in the training image can be further limited or filtered to locations marked as relevant to the feature of interest. For example, a "care" flag can be placed on relevant points. Other points outside this region can be flagged as "don't care" and omitted from the process. For example, in an image with a red button among other elements, a user can specify, by way of a mask image that matches the training image, that only the red button should be considered for (e.g.) color matching. This approach can be used for masking based upon predetermined grayscale and/or range/distance values as well.

Note also, as an alternative to the creation and use of a gradient image in step 310, the procedure can employ traditional processes/techniques to generate an edge image (for example, using a Sobel operator or another similar form of image filter). After locating edges in the image, the procedure applies test points to locations that are generally free of edge features. Thus, the term "gradient image" herein should be taken broadly to include alternative approaches that locate edges/high contrast regions in the image for placement of test points—wherein such an alternative approach achieves a similar result to the use of a gradient image by locating test points at locations in the image that are remote from edge features. Illustratively, the procedure can be provided with a list of edges (for example as part of a set of synthetic training data) in the image, and test points are thereby located remote from the edges.

Figure 3A:
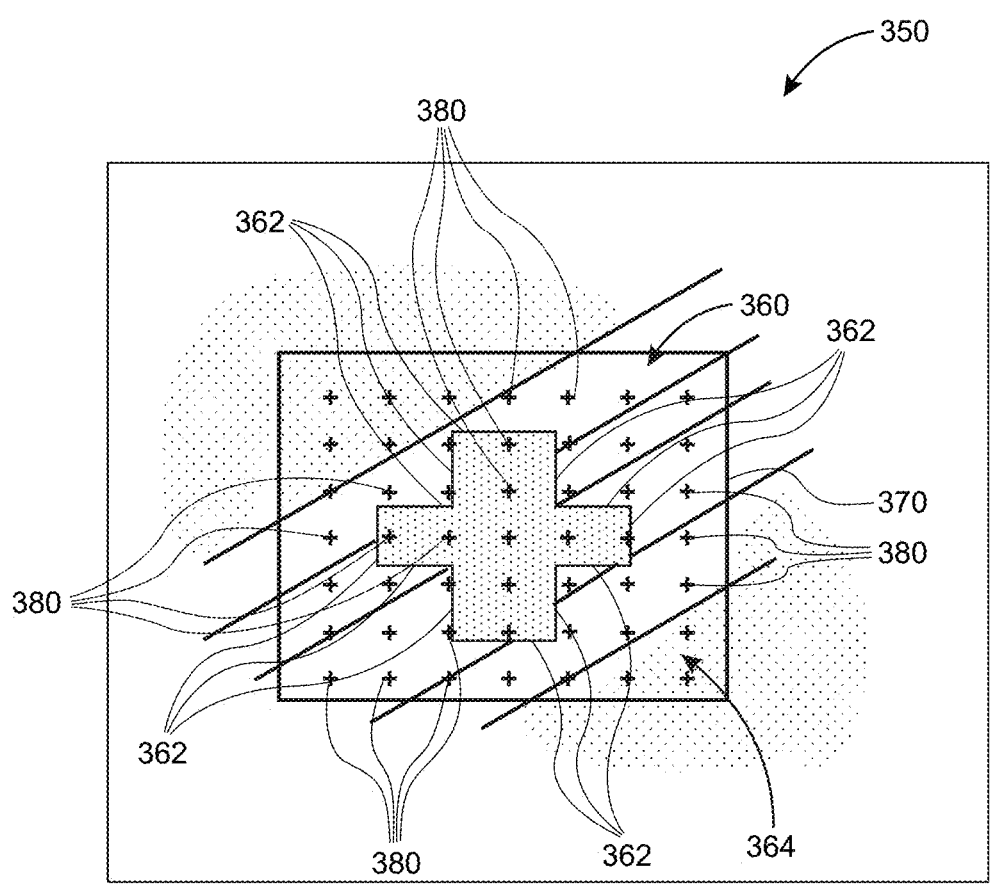
FIG. 3A is a diagram of an exemplary feature set at training time or runtime in which color test points populate an exemplary region of interest containing the feature set.

By way of non-limiting example, and as a further illustration, reference is made FIG. 3A, which shows all or a portion of an FOV 350 that contains a training feature set 360. In this case the features set 360 (edges 362) defines a crossing pattern similar to the discrete, exemplary patterns 172 and 174 in FIG. 1. A bounding box 370 (or other delineation) is located about the region containing the features 360. The edges 362 are part of an object that also contains at least one other distinguishing characteristic—color with respect to the surrounding background 364 in the bounded region 370. The bounding box can be placed automatically or by a user-specified procedure so as to fully enclose the features of interest, but avoid regions that are clearly outside the desired area in which analysis should occur. In this example, a geometric grid of test points 380 is established generally across the bounded region 370. As shown, these points fall within differing regions of color, grayscale level or range/height. The granularity of the point distribution across the image or regions of interest is highly variable as is the arrangement of the grid. In this case test points are evenly spaced in the vertical and horizontal direction. Test points can also be arranged in an array that more closely matches the general outline of the edges.

Figure 3B:
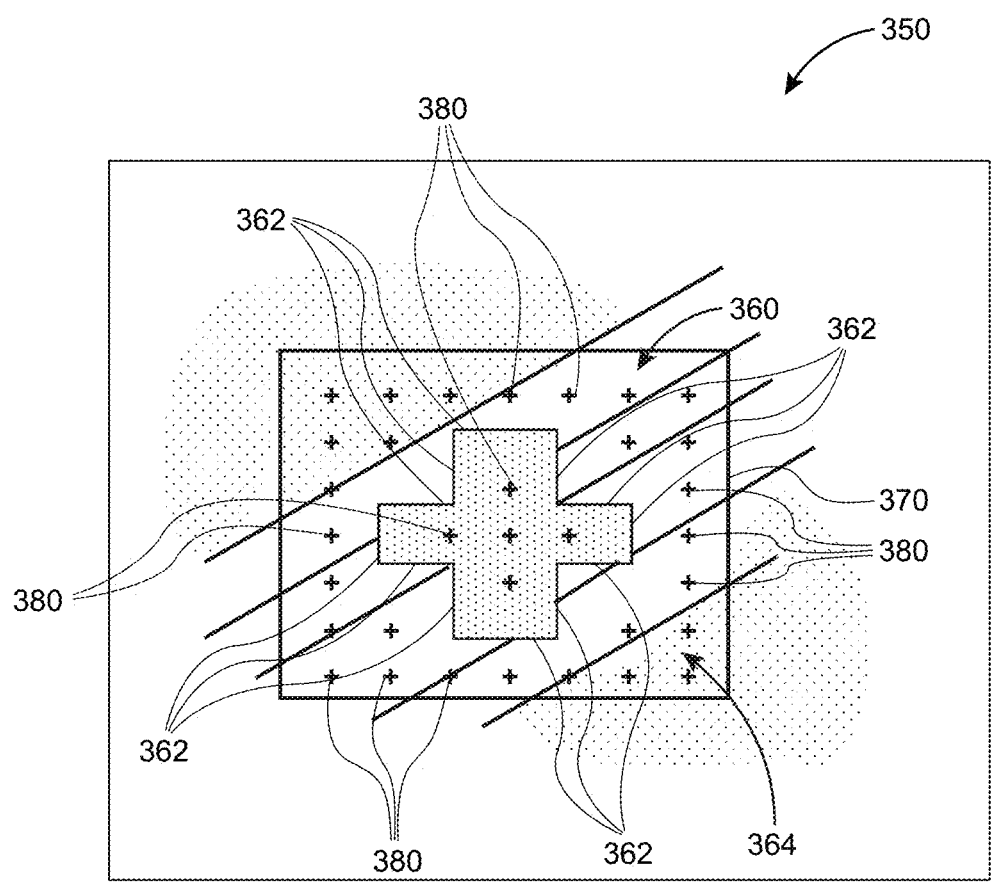
FIG. 3B is a diagram of the exemplary feature set and test point grid of FIG. 3A showing the omission of test points in areas of relatively high gradient (e.g. edges) according to an embodiment.

Likewise, while an orthogonal grid is employed, the array can be arranged (e.g.) in a polar coordinate grid. The image of FIG. 3A, depicts the array of test points 380 across the entire image without regard to gradient magnitude (edges), which makes it difficult to distinguish the differing regions of color/range/intensity within and outside the edges 362. However, as shown further in FIG. 3B, the procedure 300 particularly modifies the training or runtime image of FIG. 3A so that test points 380 near high-gradient-magnitude areas (edges 362) are omitted. The remaining test points in this version of the image are either clearly within the edges 362 or in the background region 370. Thus, the actual placement of test points on the image is typically in accordance with the depicted example of FIG. 3B. In this example, the placement of test points clearly within each region allows the procedure to effectively delineate distinct regions of color/grayscale/intensity.

Figure 4:
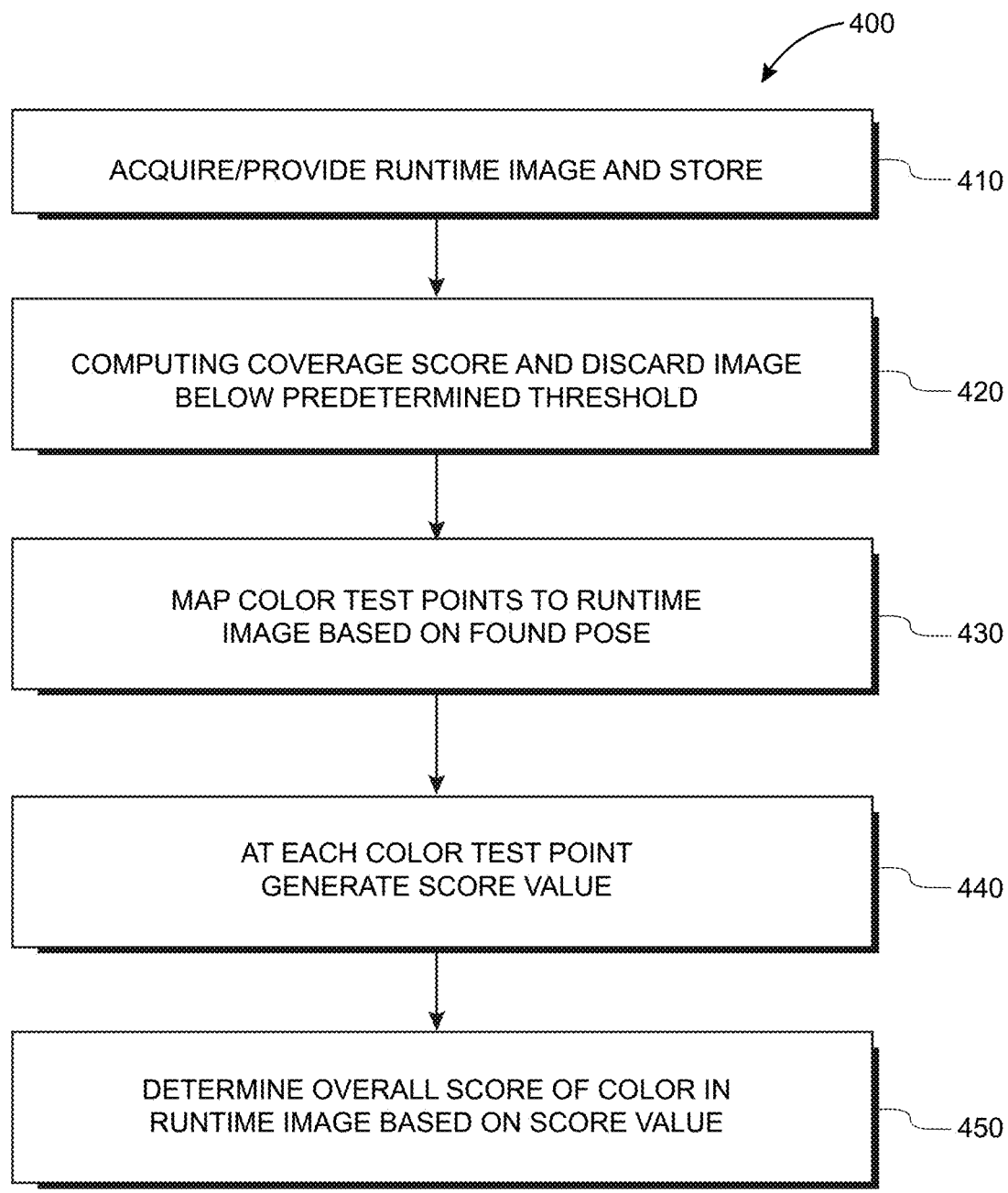
FIG. 4 is a flow diagram of an exemplary runtime color information match determination procedure in which color test points are mapped to a runtime image candidate pose and the level of match between training and runtime test points is determined therefrom.

FIG. 4 shows a runtime procedure 400, in accordance with the exemplary application referenced above, in which an acquired image (a candidate image) is to be scored for determination of the degree of matching color relative to the trained model. The image is acquired by the camera assembly 120 (FIG. 1), and stored, or otherwise provided to the system, for runtime analysis at step 410. In step 420, the procedure 400 computes the candidate pose and coverage (raw) score for the image and optionally the clutter score as well. If raw score is below the "accept" threshold, then the candidate runtime image is discarded and the next candidate pose is analyzed—indicating a "reject" status. The computation of coverage and generation of regular image "probes" and other mechanisms for aligning/scoring of images in runtime can be accomplished using commercially available pattern matching tools and processes described further below (e.g. Cognex PatMax®, PatMax RedLine®, etc.). Additionally, a runtime mask can be used to avoid scoring any region of the runtime candidate image that has been masked out at runtime as not relevant to the color matching procedure. Note that at least a basic (e.g. coarse) registration process is used at an appropriate time within the overall process to align the coordinate space of the runtime image with the coordinate space of the training pattern.

In step 440, the found "pose" of the runtime image is used to map the color test points to the coordinate space of the runtime image. For each point, the procedure 400 scores it at step 450. The score at step 450 at a mapped point is the either the difference between the acquired color image and the color image in the training pattern at that mapped point or the product of the mean-subtracted color image and the mean-subtracted color image in the training pattern at the mapped point. Alternatively, the score can be the absolute value or square of this value or a mathematical function of this value. This result can be (by way of non-limiting example) multiplied by an appropriate factor to rescale the score space to be normalized (i.e. between 0 and 1). Note that other normalization techniques (or no normalization) can be employed in alternate embodiments. By way of non-limiting example of a runtime procedure (which can be widely varied in alternate embodiments of the overall example), the computed score information can be used to generate overall score for the match between the runtime pose and training model in accordance with step 460.

Figure 5:
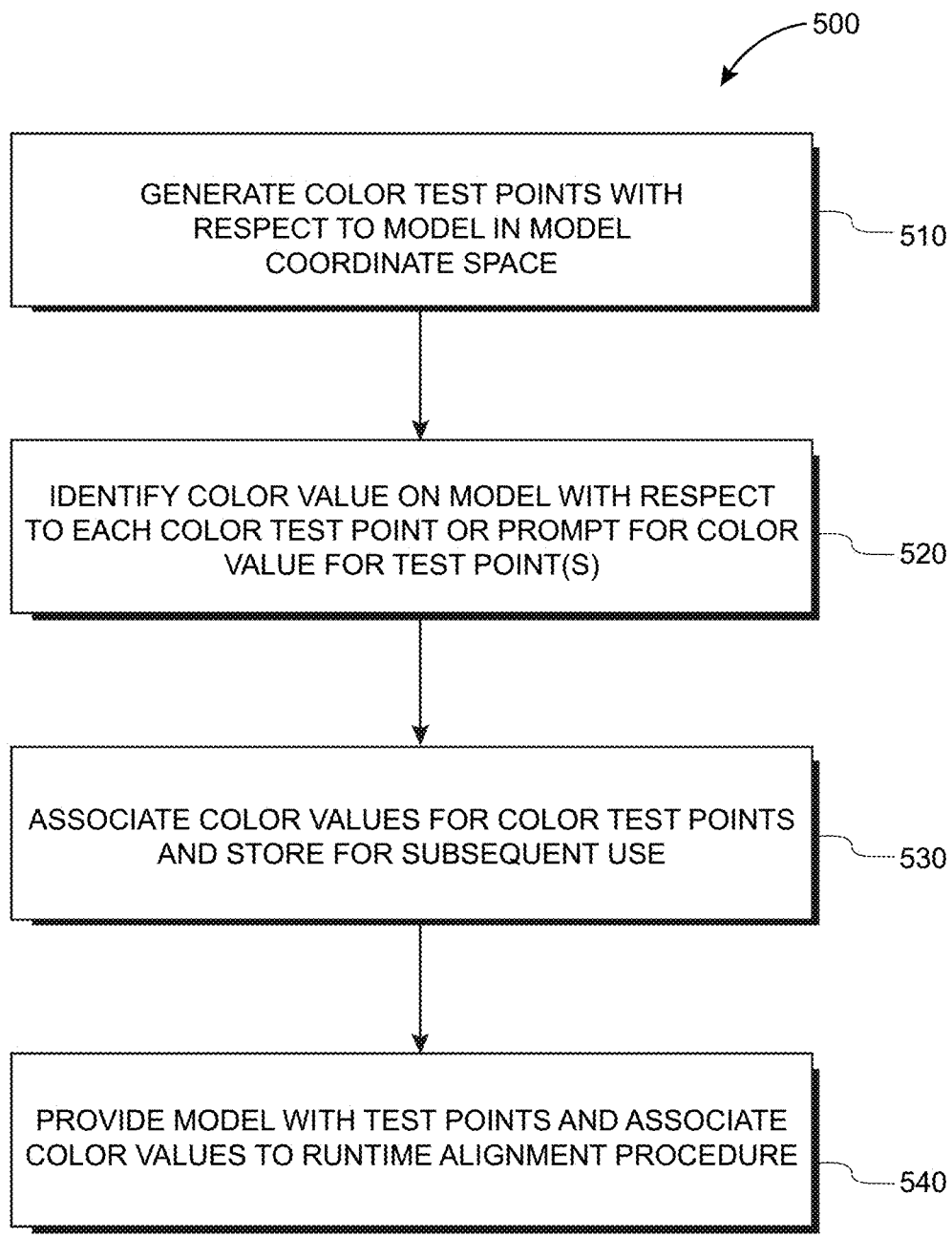
FIG. 5 is a flow diagram of a procedure for generating and associating color values to color test points in a model/pattern for use in aligning acquired object image features.

With reference to the procedure 500 of FIG. 5, the generation of color test points (step 510) entails identification of the particular color value surrounding the test point (i.e. within an identified region of stable color. At step 520, the color value is expressed as a (e.g. RGB) numeric value, or according to another metric. The value is ascertained by analyzing and extracting the color value of pixels surrounding the test point. Alternatively, the color can be provided by a user or another technique—for example, from CAD file. The respective color values derived for each of the test points is associated and stored for subsequent use (step 530), and the model with stored test points is provided as needed for use in the alignment of (e.g.) runtime acquired object features (step 540). Note that the color values for test points can vary across a given model/pattern. In general, where a model/pattern contains multiple, discrete regions of stable color, the test points in that region can be associated with that particular color value.

It should be clear that the above-described procedure and referenced application is exemplary of a wide range of possible procedures for determining test points (probes) for determining color match with respect to aligned color features in a runtime image. In alternate implementations, color test points can be generated and/or scored for match using differing techniques—for example a fixed pattern of points that is selected from a library to match a particular shape.

III. Display of Color Test Point Information to a User

Figure 6:
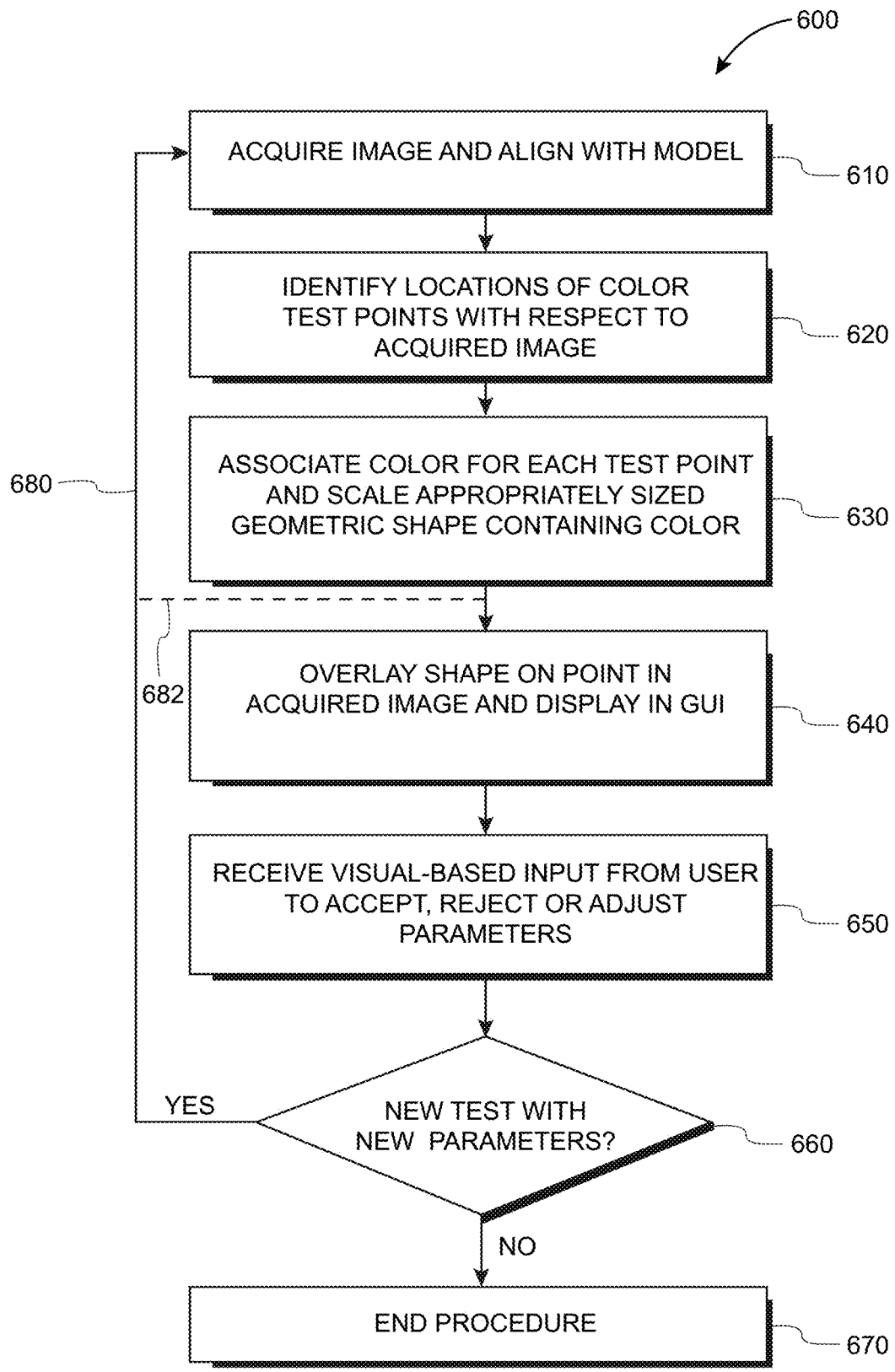
FIG. 6 is a flow diagram of a color test point, geometric shape alignment and display procedure according to an embodiment.

With reference to FIG. 1, the vision process(or) 130 includes a display process(or) 138 that carries out various functions in accordance with the embodiments of the system and method. With further reference to the procedure 600 of FIG. 6 a model or pattern is initially trained as described above, so that color test points (probes) are provided in regions of low gradient and stable color. The test points can have any appropriate granularity to achieve a reliable match. An image is acquired or retrieved from storage in step 610. This can be an image of an object used in runtime operation or an image with which that the user desires to refine the model during training/setup. The model is aligned with the image using appropriate vision tools as described above. When aligned, the system identifies the color test points of the model with respect to the acquired object features in step 620 and associates a color with each test point—based upon a color stored in the model. The procedure 600 then generates a closed, open, regular and/or irregular shape (e.g. a circle, polygon, cross, oval, etc.) in the color stored for that point in the model (step 630). In step 640, each of the colored shapes is drawn, or otherwise overlaid, onto the region containing the test point—typically centered about the point with a predetermined size and thickness that is visible to the user in a GUI display (e.g. screen 140 in FIG. 1). The drawn/overlaid geometric shape is presented in a uniform color that conforms to the trained color at that point. A variety of mechanism for identifying and storing the color to be used to draw the shape can be employed. For example, the color can be sampled from a trained object or can be specified by the user from a palette. It can also be selected as a series of RGB (or other color pixel type) values. The shape is drawn with respect to the test point location in the coordinate space of the model/pattern. The drawing operation should be clear to those of skill and can be implemented with straightforward techniques that specify geometry (circle, square, oval, etc.), size (diameter) and thickness of the drawn shape boundary. Illustratively the color test points are located far enough from a high gradient region (edge) that the respective geometric shapes fully reside in a stable color region of the trained model. This ensures that the geometric shape resides in a stable region of a properly aligned object image.

Based on the user's visual observation of the color of the geometric shape versus the color of the surrounding object image, the acuity of the human eye can allow for a qualitative judgment as to the color match. Notably, even small shades of color difference between the geometric shape and the surroundings can be visible to the eye. Based upon this visualization, the user can input appropriate feedback and instructions to the GUI of the vision system and matching procedure (step 650). Following the feedback provided by the user (or lack thereof if the match is acceptable), the procedure 600 can end (via decision step 660 and step 670), or if the feedback requires further adjustments of either the alignment process or the color matching process—for example, changing lighting, training a new model, etc.—then the procedure can be rerun with the new adjustments made (via procedure branch 680). The adjustments may allow for the existing acquired image to be reexamined (dashed line 682), or a new acquired image (via step 610) may be required to rerun the procedure 600.

Figure 7:
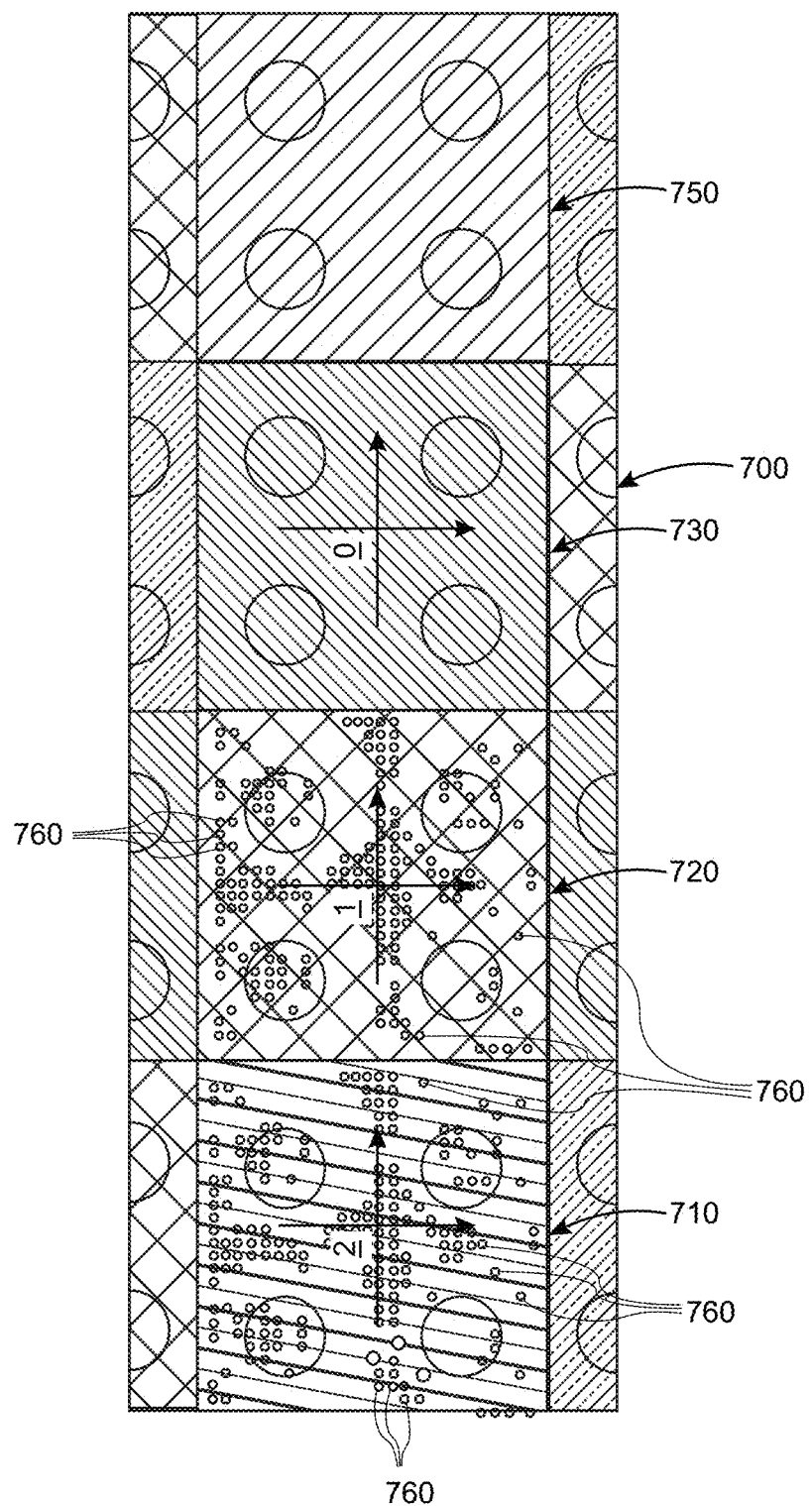
FIG. 7 is a diagram showing a screen display of an exemplary set of imaged, differently colored objects aligned with a trained pattern of a predetermined color (e.g. blue), in which geometric shapes (e.g. blue circles) are clearly visible in non-color-matched objects.

Reference is made to an exemplary multi-color image 700 of a runtime object (in this example four side-by-side building bricks 710, 720, 730 and 740) in FIG. 7. The depicted cross-hatching represents each of a plurality of base colors—white, yellow, blue, green and red. As depicted, and by way of non-limiting example, (a) narrow cross-hatching represents blue; (b) wide cross-hatching represents white; (c) crossed, cross-hatching represents red; (d) solid and dashed, alternating cross-hatching represents yellow; and (e) thin and thick, alternating cross-hatching represents green. As shown, the blue brick 730 is trained via a color pattern, and there are three alignment matches (represented by crossed axes 0, 1 and 2, based on edges, heights, etc.). All three alignment matches are displayed with colored (blue) geometric shapes (circles 760) drawn on them (generally in regions of low color gradient). The exemplary, blue circles 760 are clearly visible in the two rightmost bricks 710 and 720, but blend to the point of invisibility in the matching blue brick 730. In this example, the user's eye can only perceive the mismatched color on the two bricks 710 and 720 that are the actual mismatches. In general, the size of the shape(s) can be from approximately a few millimeters (2-3) to a few centimeters (2-3) in width/diameter. The line thickness can be from approximately a tenth of a millimeter to several millimeters (2-4). The size of the geometric shapes, thickness of lines forming them, and their spread (granularity/spacing) is highly variable in alternate embodiments. Likewise, the size of the shapes can vary (about the test point center) based upon the overall size of the features in the image, and the level of zoom the user applies to the feature of interest in the GUI. In general the system can define a minimum and maximum size for a given geometric shape so that it does not become undiscernible against the background.

Notably, the shape can define a variety of regular and irregular curvilinear and/or polygonal geometries. An advantage to a closed shape, such as a circle, is that it allows the user to compare the interior color of the object image to the trained color of the shape. Nevertheless open shapes, such a crosses, lines, etc., are expressly contemplated in alternate embodiments. Likewise, shapes can be solid—for example, dots or spots, wherein the user visually analyzes the background region on the object surrounding such a solid shape.

It should be clear that the use of color matching shapes can allow the user to adjust various internal and external parameters with respect to the camera(s) and/or imaged scene. That is, where the color match is clearly insufficient, the user can determine whether there is a required change in the imaging setup (for example lighting) or whether the color mismatch is a runtime defect that should be corrected during production of the imaged part or object. Color mismatch can also be used to determine whether alignment is operating correctly and/or whether the inspected runtime object has a missing or deformed element—that is, if a color shape appears in a different colored background (e.g. the conveyor), this condition may result when a portion of the inspected object is missing.

As described above, the pattern may contain multiple regions of stable color that are discrete from each other—for example, a patch of blue and a patch of red. Hence the geometric shapes are similarly colored. Thus, where the underlying aligned object has multiple color regions, the user can determine if the color regions on the object are properly applied based on the match with each set of directed colored geometric shapes. That is, if a red circle is overlaid onto a blue region of the object image, then it is likely the blue has been misapplied to the object (or alignment is incorrect).

Another use for the results of a color match in accordance with the above procedure is to assist the user in the creation of a mask that avoids analysis of overly noisy or naturally variable regions of the object—for example where variable printing may be applied.

Figure 8:
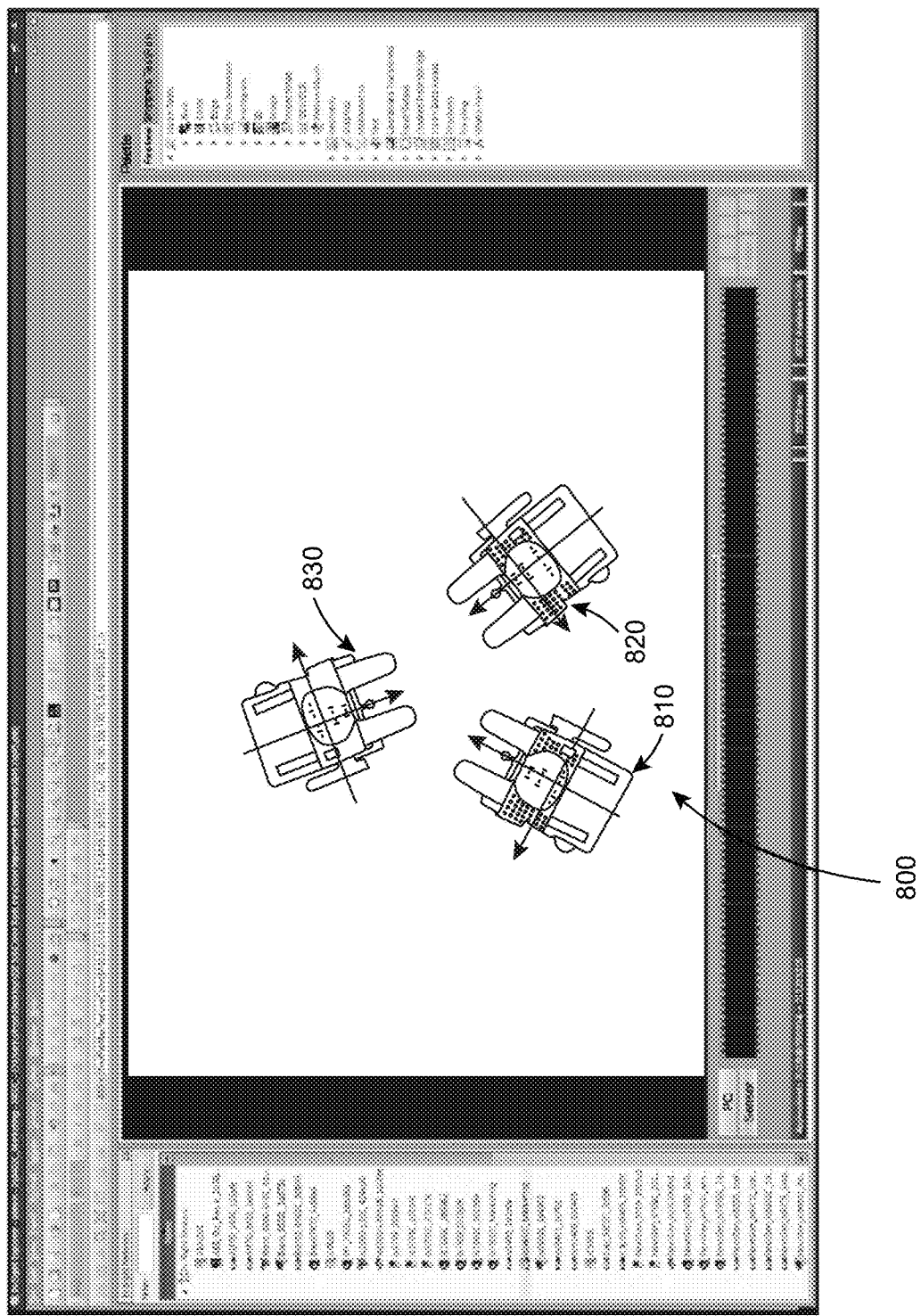
FIG. 8 is a diagram of an exemplary graphical user interface for use in accordance with the system of FIG. 1, showing three aligned objects with differing degree of color match.
Figure 9:
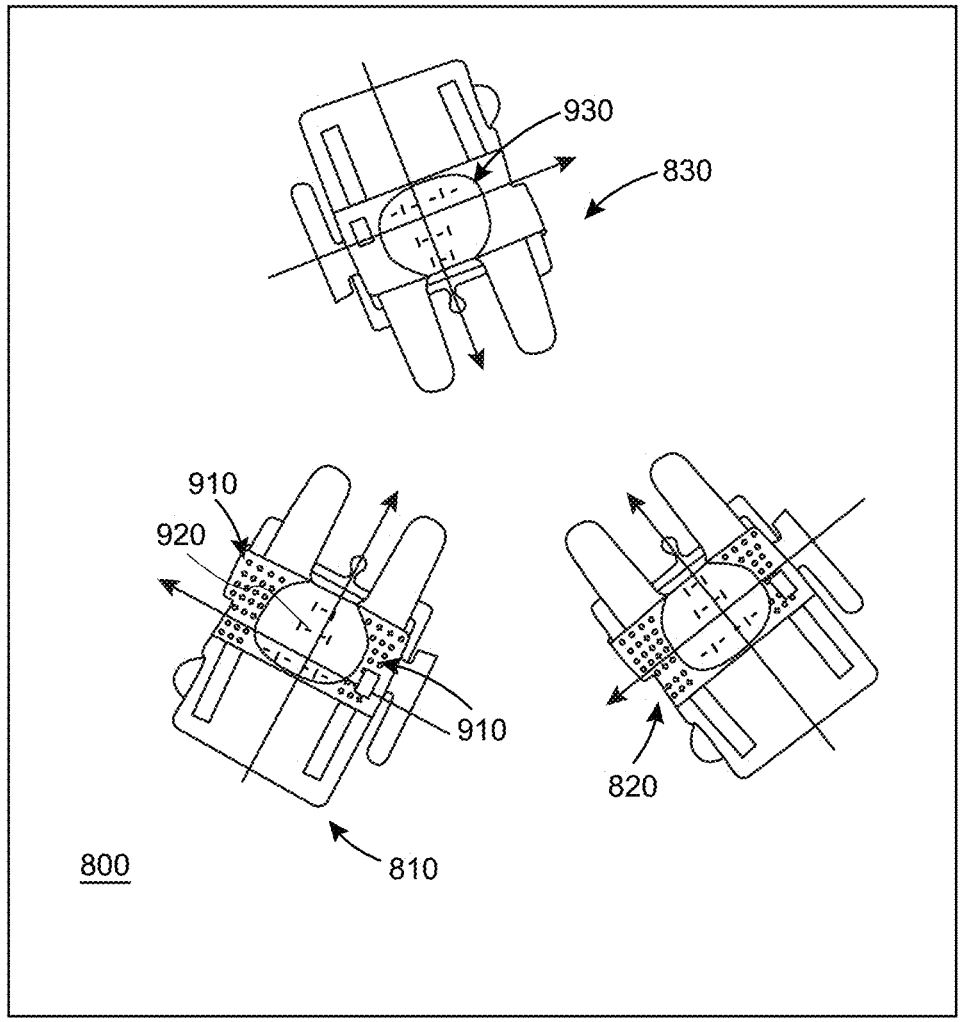
FIG. 9 is a more detailed view of the three displayed objects of FIG. 8.

Referring briefly to FIGS. 8 and 9 an exemplary user interface screen 800 is shown. In this example three objects 810, 820 and 830 have been aligned with respect to the color pattern/model. Illustratively, the white part 830 is trained for color (i.e. the training model defines a similar white in its various test points). The other parts 810 and 820 are matches with varying degrees of color match quality. The user would be able to discern a series of the small (e.g. white) circles drawn next to the white label 920, particularly on part 910 at the bottom left of the screen 800. Such circles blend with the full white label 930 and of the part 830 at the upper right of the screen 800, and would be barely visible or invisible due to the close color match.

IV. Conclusion

Based on the displayed information the user's eye can effectively judge for the quality of the color match between the model and the runtime image features. Users will generally perceive any mismatch in the manner that their eyes distinguish the colors, which is what they expect. This approach mitigates or removes the need for an intermediate process to judge the mismatch and attempt to quantify and report it on a point-by-point basis. Such a process would inevitably fail to model exactly what users consider a successful or unsuccessful (i.e. good or bad) match for their particular vision system application, colors, and/or lighting. By using the users' own eyes the interface is as flexible as the users themselves are, for their particular application. Hence, it should be clear that the above-described system and method desirably provides a user of a vision system with useful information as to the degree of color match between a trained/expected pattern and an actual imaged object. The information can be used to refine the training. The information can also, or alternatively, be employed by the user to determine the appropriateness of setup of vision system equipment, lighting, and other elements of the scene. Similarly, the information can allow defects to be detected manually based on clear color match differences that would occur mainly in the presence of such an object defect.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. For example, as used herein various directional and orientational terms (and grammatical variations thereof), such as "vertical", "horizontal", "up", "down", "bottom", "top", "side", "front", "rear", "left", "right", "forward", "rearward", and the like, are used only as relative conventions and not as absolute orientations with respect to a fixed coordinate system, such as the acting direction of gravity. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor herein can be implemented using electronic hardware, software consisting of a non-transitory computer-readable medium of program instructions, or a combination of hardware and software. Additionally, where the term "substantially" or "approximately" is employed with respect to a given measurement, value or characteristic, it refers to a quantity that is within a normal operating range to achieve desired results, but that includes some variability due to inherent inaccuracy and error within the allowed tolerances of the system (e.g. 1-5 percent). Accordingly, this description is meant to be taken only by way of example, and not to otherwise limit the scope of this invention.

What is claimed is:

1. A system for displaying color match information on an acquired image of an object comprising:
   a model having a plurality of color test points at locations of stable color having a gradient magnitude less than a predetermined gradient magnitude threshold;
   a display process that generates visible geometric shapes overlaid onto regions of the acquired image with respect to the color test points in a predetermined color;
   an alignment process that aligns features of the object with respect to features on the model so that the geometric shapes appear in locations on the object that correspond to locations on the model; and
   an interface that allows a user to input at least one of feedback and adjustments to a vision system associated with the alignment process based on visual analysis of the displayed visible geometric shapes,
   wherein a color match is determined by providing a value for the color in a predetermined color space of the model at the test points and comparing to values at respective mapped points in the image of the object.

2. The system as set forth in claim 1 wherein the geometric shapes comprise closed shapes that surround the regions of the acquired image expected to be stable color on the object.

3. The system as set forth in claim 2 wherein the geometric shapes comprise at least one of circles, squares, ovals and diamonds.

4. The system as set forth in claim 2 wherein the geometric shapes are sized so as to be visible by a user compared to an adjacent background on the object within a predetermined range of zoom of features of the object in a display.

5. The system as set forth in claim 1, further comprising a scoring process that maps the color test points with respect to the runtime image and provides a color score for each of the points to determine whether a sufficient match has occurred.

6. The system as set forth in claim 1, further comprising a mask that is applied to the image of the object, wherein the mask indicates which areas of the image of the object are evaluated for color match.

7. The system as set forth in claim 1 wherein the predetermined gradient magnitude threshold is established by at least one of (a) a user-input parameter and (b) a system-generated parameter.

8. The system as set forth in claim 1, wherein the predetermined color of the visible geometric shapes is a color associated with a corresponding color test point.

9. The system as set forth in claim 1, wherein the visible geometric shapes are distinct from features of the object.

10. The system as set forth in claim 1, wherein at least one of the visible geometric shapes has the predetermined color corresponding to a stored color of at least one of the plurality of test points of the model.

11. A method for determining a color match on an acquired image of an object comprising the steps of:
    providing a model having a plurality of color test points at locations of stable color having a gradient magnitude less than a predetermined gradient magnitude threshold;
    generating, on a display, visible geometric shapes overlaid onto regions of the acquired image with respect to the color test points in a predetermined color;
    aligning features of the object with respect to features on the model so that the geometric shapes appear in locations on the object that correspond to locations on the model;
    allowing, with a user interface, a user to input at least one of feedback and adjustments to a vision system associated with the alignment process based on visual analysis of the displayed geometric shapes; and
    determining a color match by providing a value for the color in a predetermined color space of the model at the test points and comparing to values at respective mapped points in the image of the object.

12. The method as set forth in claim 11 wherein the geometric shapes comprise closed shapes that surround the regions of the acquired image expected to be stable color on the object.

13. The method as set forth in claim 12, further comprising, drawing the geometric shapes to define at least one of circles, squares, ovals and diamonds.

14. The method as set forth in claim 12, further comprising the geometric shapes so as to be visible by a user compared to an adjacent background on the object within a predetermined range of zoom of features of the object in a display.

15. The method as set forth in claim 11, further comprising, mapping the color test points with respect to the runtime image and providing a color score for each of the points to determine whether a sufficient match has occurred.

16. The method as set forth in claim 11, further comprising, applying a mask to the image of the object, wherein the mask indicates which areas of the image of the object are evaluated for color match.

17. The method as set forth in claim 11 wherein the predetermined gradient magnitude threshold is established by at least one of (a) a user-input parameter and (b) a system-generated parameter.

18. A vision system arranged for displaying color match information on an acquired image of an object comprising:

a model having a plurality of color test points at locations of stable color;

a display process, associated with the vision system, that generates visible geometric shapes overlaid onto regions of the acquired image with respect to the color test points in a predetermined color;

an alignment process that aligns features of the object with respect to features on the model so that the visible geometric shapes appear in locations on the object that correspond to locations on the model and conducts an additional alignment of the features of the object with respect to the features of the model based at least in part upon visual-based feedback; and an interface that allows a user to input at least one of feedback and adjustments to the vision system based on visual analysis of the displayed visible geometric shapes, wherein a color match is determined by providing a value for the color in a predetermined color space of the model at the test points and comparing to values at respective mapped points in the image of the object.

\* \* \* \* \*